United States Patent
Park et al.

(10) Patent No.: US 9,809,677 B2
(45) Date of Patent: *Nov. 7, 2017

(54) POLYCARBONATE COMPOSITION AND ARTICLE COMPRISING THE SAME

(71) Applicant: LG CHEM, LTD., Seoul (KR)

(72) Inventors: Jung Jun Park, Daejeon (KR); Young Young Hwang, Daejeon (KR); Moo Ho Hong, Daejeon (KR); Hyong Min Bahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/027,907

(22) PCT Filed: Dec. 4, 2015

(86) PCT No.: PCT/KR2015/013243
§ 371 (c)(1),
(2) Date: Apr. 7, 2016

(87) PCT Pub. No.: WO2016/089168
PCT Pub. Date: Jun. 9, 2016

(65) Prior Publication Data
US 2016/0326321 A1 Nov. 10, 2016

(30) Foreign Application Priority Data
Dec. 4, 2014 (KR) .................. 10-2014-0173005

(51) Int. Cl.
*C08L 69/00* (2006.01)
*C08G 64/08* (2006.01)
(Continued)

(52) U.S. Cl.
CPC ........... *C08G 64/085* (2013.01); *C08G 64/06* (2013.01); *C08G 64/1666* (2013.01); *C08G 64/1691* (2013.01); *C08G 64/18* (2013.01); *C08G 64/186* (2013.01); *C08G 64/24* (2013.01); *C08G 64/307* (2013.01); *C08G 64/38* (2013.01); *C08G 77/448* (2013.01); *C08J 5/00* (2013.01); *C08K 5/3475* (2013.01); *C08L 69/00* (2013.01); *C08L 69/005* (2013.01); *C08L 83/04* (2013.01);
(Continued)

(58) Field of Classification Search
CPC ..................................................... C08L 69/00
See application file for complete search history.

(56) References Cited

U.S. PATENT DOCUMENTS 3,819,744 A   6/1974  Buechner et al.
5,137,949 A   8/1992  Paul et al.
(Continued)

FOREIGN PATENT DOCUMENTS

CN   101124282 A   2/2008
CN   101585961 A   11/2009
(Continued)

OTHER PUBLICATIONS

Hwang, et al.: "Production of impact strength and fluidity-improved polycarbonate and composition comprising same", Chemical Abstract for US2016/0251481A1, Mar. 24, 2016.
(Continued)

*Primary Examiner* — David Buttner
(74) *Attorney, Agent, or Firm* — Dentons US LLP

(57) ABSTRACT

Disclosed is a polycarbonate composition including (a) a branched polycarbonate comprising a repeating unit represented by Chemical Formula 1 and a trivalent or tetravalent branched repeating unit connecting the plurality of repeating units represented by Chemical Formula 1 to each other; and (b) a copolycarbonate comprising an aromatic polycarbonate-based first repeating unit, and aromatic polycarbonate-based second repeating units having siloxane bonds which include a repeating unit represented by Chemical Formula 4 and a repeating unit represented by Chemical Formula 5:

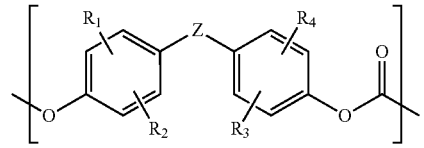

[Chemical Formula 1]

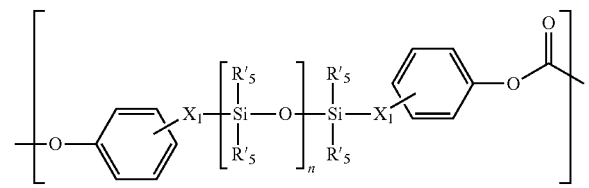

[Chemical Formula 4]

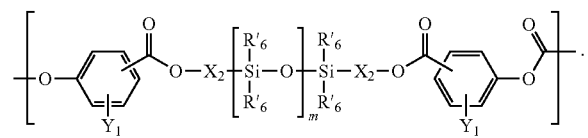

[Chemical Formula 5]

The polycarbonate composition improves flame retardancy and chemical resistance while maintaining high impact strength and melt index.

16 Claims, No Drawings

(51) Int. Cl.
  *C08G 64/18* (2006.01)
  *C08G 64/38* (2006.01)
  *C08G 77/448* (2006.01)
  *C08J 5/00* (2006.01)
  *C08G 64/16* (2006.01)
  *C08G 64/06* (2006.01)
  *C08G 64/30* (2006.01)
  *C08K 5/3475* (2006.01)
  *C08L 83/04* (2006.01)
  *C08G 64/24* (2006.01)
  *C08L 83/10* (2006.01)

(52) U.S. Cl.
  CPC ............ *C08L 83/10* (2013.01); *C08L 2201/10* (2013.01); *C08L 2205/02* (2013.01); *C08L 2205/025* (2013.01)

(56) References Cited

U.S. PATENT DOCUMENTS

| | | | |
|---|---|---|---|
| 5,324,454 A | 6/1994 | Takata et al. | |
| 5,380,795 A | 1/1995 | Gosens et al. | |
| 5,455,310 A | 10/1995 | Hoover et al. | |
| 5,502,134 A | 3/1996 | Okamoto et al. | |
| 5,608,026 A | 3/1997 | Hoover et al. | |
| 5,783,651 A | 7/1998 | König et al. | |
| 5,932,677 A | 8/1999 | Hoover et al. | |
| 6,001,929 A | 12/1999 | Nodera et al. | |
| 6,252,013 B1 | 6/2001 | Banach et al. | |
| 6,281,286 B1 | 8/2001 | Chorvath et al. | |
| 6,780,956 B2 | 8/2004 | Davis | |
| 7,135,538 B2 | 11/2006 | Glasgow et al. | |
| 7,332,559 B2 | 2/2008 | Hong et al. | |
| 7,432,327 B2 | 10/2008 | Glasgow | |
| 7,498,401 B2 | 3/2009 | Agarwal | |
| 7,524,919 B2 | 4/2009 | Hoover et al. | |
| 7,691,304 B2 | 4/2010 | Agarwal et al. | |
| 7,709,581 B2 | 5/2010 | Glasgow et al. | |
| 7,718,733 B2 | 5/2010 | Juikar et al. | |
| 8,030,379 B2 | 10/2011 | Nodera et al. | |
| 8,084,134 B2 | 12/2011 | Malinoski et al. | |
| 8,124,683 B2 | 2/2012 | Jung et al. | |
| 8,389,648 B2 | 3/2013 | Adoni et al. | |
| 8,466,249 B2 | 6/2013 | Gallucci et al. | |
| 8,552,096 B2 | 10/2013 | Li et al. | |
| 8,912,290 B2 | 12/2014 | Huggins et al. | |
| 8,933,186 B2 | 1/2015 | Bahn et al. | |
| 8,962,780 B2 | 2/2015 | Higaki et al. | |
| 8,981,017 B2 | 3/2015 | Ishikawa | |
| 9,062,164 B2 | 6/2015 | Kim et al. | |
| 9,080,021 B2 | 7/2015 | Ishikawa et al. | |
| 9,102,832 B2 | 8/2015 | Sybert et al. | |
| 9,255,179 B2 | 2/2016 | Park et al. | |
| 2003/0027905 A1 | 2/2003 | Mahood et al. | |
| 2003/0065122 A1 | 4/2003 | Davis | |
| 2004/0200303 A1 | 10/2004 | Inoue et al. | |
| 2006/0148986 A1 | 7/2006 | Glasgow et al. | |
| 2007/0093629 A1 | 4/2007 | Silva et al. | |
| 2007/0135569 A1 | 6/2007 | DeRudder | |
| 2007/0241312 A1 | 10/2007 | Hikosaka | |
| 2007/0258412 A1 | 11/2007 | Schilling et al. | |
| 2008/0015289 A1 | 1/2008 | Siripurapu | |
| 2008/0081895 A1 | 4/2008 | Lens et al. | |
| 2008/0230751 A1 | 9/2008 | Li et al. | |
| 2009/0087761 A1 | 4/2009 | Fukushima et al. | |
| 2009/0326183 A1 | 12/2009 | Schultz et al. | |
| 2010/0233603 A1 | 9/2010 | Hikosaka | |
| 2012/0123034 A1 | 5/2012 | Morizur et al. | |
| 2012/0251750 A1 | 10/2012 | Sybert et al. | |
| 2012/0252985 A1 | 10/2012 | Rosenquist et al. | |
| 2012/0271009 A1 | 10/2012 | Higaki et al. | |
| 2012/0283393 A1 | 11/2012 | Ishikawa | |
| 2013/0003544 A1 | 1/2013 | Wermuth et al. | |
| 2013/0082222 A1 | 4/2013 | Aoki | |
| 2013/0186799 A1 | 7/2013 | Stam et al. | |
| 2013/0190425 A1 | 7/2013 | Zhu et al. | |
| 2013/0267665 A1 | 10/2013 | Huggins et al. | |
| 2013/0274392 A1 | 10/2013 | Morizur et al. | |
| 2013/0289224 A1 | 10/2013 | Bae et al. | |
| 2013/0309474 A1 | 11/2013 | Peek et al. | |
| 2013/0313493 A1 | 11/2013 | Wen et al. | |
| 2013/0317142 A1 | 11/2013 | Chen et al. | |
| 2013/0317146 A1* | 11/2013 | Li | C08K 3/22 524/116 |
| 2013/0317150 A1 | 11/2013 | Wan et al. | |
| 2013/0331492 A1 | 12/2013 | Sharma | |
| 2014/0106208 A1 | 4/2014 | Ishikawa et al. | |
| 2014/0148559 A1 | 5/2014 | Kim et al. | |
| 2014/0179843 A1 | 6/2014 | Van Der Mee et al. | |
| 2014/0323623 A1 | 10/2014 | Miyake et al. | |
| 2015/0057423 A1 | 2/2015 | Kim et al. | |
| 2015/0175802 A1 | 6/2015 | Sybert et al. | |
| 2015/0197633 A1* | 7/2015 | Van Der Mee | C08L 83/10 524/151 |
| 2015/0210854 A1 | 7/2015 | Aoki | |
| 2015/0218371 A1 | 8/2015 | Lee et al. | |
| 2015/0307706 A1 | 10/2015 | Rosenquist et al. | |
| 2015/0315380 A1 | 11/2015 | Bahn et al. | |
| 2015/0344623 A1 | 12/2015 | Park et al. | |
| 2015/0368484 A1 | 12/2015 | Shishaku et al. | |
| 2016/0002410 A1 | 1/2016 | Iyer et al. | |
| 2016/0017102 A1 | 1/2016 | Yamada | |
| 2016/0122477 A1 | 5/2016 | Rhee et al. | |
| 2016/0251481 A1 | 9/2016 | Hwang et al. | |
| 2016/0297926 A1* | 10/2016 | Hwang | C08G 64/307 |
| 2016/0326312 A1* | 11/2016 | Park | C08G 64/18 |
| 2016/0326313 A1 | 11/2016 | Son et al. | |
| 2016/0326314 A1* | 11/2016 | Son | C08G 64/18 |
| 2016/0326321 A1 | 11/2016 | Park et al. | |
| 2016/0369047 A1 | 12/2016 | Hwang et al. | |
| 2016/0369048 A1* | 12/2016 | Park | C08G 64/18 |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0284865 A2 | 3/1988 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 2015-163722 A | 9/2015 |
| JP | 3049113 B2 | 12/2016 |

(56) References Cited

FOREIGN PATENT DOCUMENTS

| | | |
|---|---|---|
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 1020080083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 101563269 B1 | 10/2015 |
| KR | 1020150119823 A | 10/2015 |
| KR | 2015-0134457 A | 12/2015 |
| TW | 201241043 A | 10/2012 |
| WO | 2012060516 A1 | 5/2012 |
| WO | 2013/051557 A1 | 4/2013 |
| WO | 2013-058214 A1 | 4/2013 |
| WO | 2013/073709 A1 | 5/2013 |
| WO | 2013/100606 A1 | 7/2013 |
| WO | 2013-115538 A1 | 8/2013 |
| WO | 2013/175445 A2 | 11/2013 |
| WO | 2013175455 A1 | 11/2013 |
| WO | 2014042252 A1 | 3/2014 |
| WO | 2014/058033 A1 | 4/2014 |
| WO | 2014/119827 A1 | 8/2014 |
| WO | 2014/139110 A1 | 9/2014 |
| WO | 2014/144673 A1 | 9/2014 |
| WO | 2015/011669 A2 | 1/2015 |
| WO | 2015/015445 A2 | 2/2015 |
| WO | WO-2015/041441 * | 3/2015 |
| WO | 2015/087595 A1 | 6/2015 |

OTHER PUBLICATIONS

Chemical Abstract registry No. 163617-00-3, Jun. 8, 1995.

* cited by examiner

POLYCARBONATE COMPOSITION AND ARTICLE COMPRISING THE SAME

CROSS-REFERENCE TO RELATED APPLICATION(S)

This application is a National Stage Entry of International Application No. PCT/KR2015/013243 filed on Dec. 4, 2015, and claims the benefit of and priority to Korean Application No. 10-2014-0173005 filed on Dec. 4, 2014, all of which are hereby incorporated by reference in their entirety for all purposes as if fully set forth herein.

TECHNICAL FIELD

The present invention relates to a polycarbonate composition and an article comprising the same, and more specifically, to a polycarbonate composition comprising a copolycarbonate comprising a specific siloxane structure and a branched polycarbonate comprising a branched repeating unit to improve flame retardancy and chemical resistance while maintaining high impact strength and melt index.

BACKGROUND OF ART

Polycarbonate resins are prepared by condensation-polymerization of an aromatic diol such as bisphenol A with a carbonate precursor such as a phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerizing two or more aromatic diol compounds having different structures from each other and introducing units having different structures in a main chain of the polycarbonate.

Especially, studies for introducing a polysiloxane structure in a main chain of the polycarbonate have proceeded, but most of these technologies have disadvantages in that production costs are high, and flame retardancy and chemical resistance are deteriorated.

Given the above circumstances, the present inventors have found that a polycarbonate composition comprising a copolycarbonate comprising a specific siloxane structure and a branched polycarbonate comprising a branched repeating unit is capable of improving flame retardancy and chemical resistance while maintaining high impact strength and melt index. The present invention has been completed on the basis of such a finding.

DETAILED DESCRIPTION OF THE INVENTION

Technical Problem

It is an object of the present invention to provide a polycarbonate composition having improved flame retardancy and chemical resistance while maintaining high impact strength and melt index.

It is a further object of the present invention to provide an article comprising the polycarbonate composition.

Technical Solution

An exemplary embodiment of the present invention provides a polycarbonate composition comprising: (a) a branched polycarbonate comprising a repeating unit represented by Chemical Formula 1 below and a trivalent or tetravalent branched repeating unit connecting the plurality of repeating units represented by Chemical Formula 1 below to each other; and (b) a copolycarbonate comprising an aromatic polycarbonate-based first repeating unit, and one or more aromatic polycarbonate-based second repeating units having siloxane bonds:

[Chemical Formula 1]

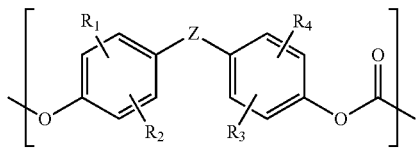

in the Chemical Formula 1, $R_1$, $R_2$, $R_3$ and $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Polycarbonate is prepared by condensation-polymerization of an aromatic diol compound such as bisphenol A with a carbonate precursor such as phosgene, and has excellent impact strength, dimensional stability, heat resistance and transparency. Thus, the polycarbonate has application in a wide range of uses, such as exterior materials of electrical and electronic products, automobile parts, building materials, and optical components. In order to more improve physical properties of the polycarbonate, a polysiloxane structure may be introduced in a main chain of the polycarbonate, and accordingly, various physical properties may be improved. However, despite the above-described improvement in various physical properties, the polycarbonate in which the polysiloxane structure is introduced needs to have excellent flame retardancy and chemical resistance so as to be appropriate for various application fields. For this purpose, various additives may be used together, but these additives may be a factor that deteriorates original physical properties of the polycarbonate.

Accordingly, the present invention provides the polycarbonate composition comprising the copolycarbonate in which the polysiloxane structure is introduced in the main chain of the polycarbonate and comprising the branched polycarbonate in which the branched repeating unit is introduced as described below, thereby improving flame retardancy and chemical resistance while maintaining high impact strength and melt index.

Hereinafter, the present invention is described in more detail.

Branched Polycarbonate (a)

In the branched polycarbonate (a) used in the present invention, the trivalent or tetravalent branched repeating unit may be various trivalent or tetravalent repeating units known in the art, but preferably, may be a repeating unit represented by Chemical Formula 2 below. That is, as a preferable example, the branched polycarbonate (a) may comprise the repeating unit represented by Chemical Formula 1 above and the repeating unit represented by Chemical Formula 2 below:

[Chemical Formula 2]

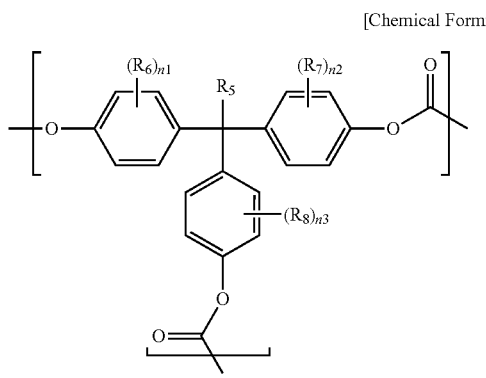

in the Chemical Formula 2,
$R_5$ is hydrogen, $C_{1-10}$ alkyl, or,

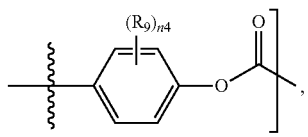

$R_6$, $R_7$, $R_8$ and $R_9$ are each independently hydrogen, $C_{1-10}$ alkyl, halogen, $C_{1-10}$ alkoxy, allyl, $C_{1-10}$ haloalkyl, or $C_{6-20}$ aryl, and
n1, n2, n3 and n4 are each independently an integer of 1 to 4.

The repeating unit represented by Chemical Formula 1 is formed by reacting the aromatic diol compound and the carbonate precursor.

In Chemical Formula 1, preferably, $R_1$, $R_2$, $R_3$ and $R_4$ are each independently hydrogen, methyl, chloro, or bromo.

In addition, preferably, Z is a linear or branched $C_{1-10}$ alkylene unsubstituted or substituted with phenyl, and more preferably, methylene, ethane-1,1-diyl, propane-2,2-diyl, butane-2,2-diyl, 1-phenylethane-1,1-diyl, or diphenylmethylene. In addition, preferably, Z is cyclohexane-1,1-diyl, O, S, SO, $SO_2$, or CO.

Preferably, the repeating unit represented by Chemical Formula 1 may be derived from any one or more aromatic diol compounds selected from the group consisting of bis (4-hydroxyphenyl)methane, bis(4-hydroxyphenyl)ether, bis (4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl) propyl]polydimethylsiloxane.

As used herein, 'derived from aromatic diol compounds' means that a hydroxy group of the aromatic diol compound and the carbonate precursor are reacted to form the repeating unit represented by Chemical Formula 1.

For example, when bisphenol A, which is the aromatic diol compound, and triphosgene, which is the carbonate precursor, are polymerized, the repeating unit represented by Chemical Formula 1 is represented by Chemical Formula 1-1 below:

[Chemical Formula 1-1]

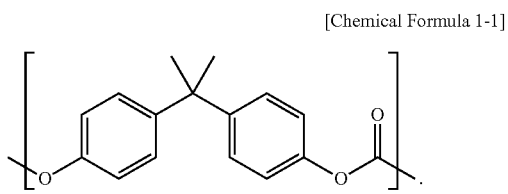

As the carbonate precursor, at least one selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromo phosgene, and bishalo formate may be used. Preferably, triphosgene or phosgene may be used.

The repeating unit represented by Chemical Formula 2 is formed by reacting an aromatic polyol compound and the carbonate precursor.

In Chemical Formula 2, preferably, $R_5$ is $C_{1-6}$ alkyl, or

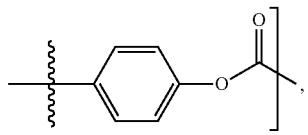 [SMILES: *c1ccc(OC(C)=O)cc1]

more preferably, $C_{1-4}$ alkyl, and the most preferably, methyl.

In addition, preferably, $R_6$, $R_7$, $R_8$ and $R_9$ are each independently, hydrogen, $C_{1-6}$ alkyl, or halogen, and more preferably, hydrogen.

The repeating unit represented by Chemical Formula 2 is derived from an aromatic polyol compound represented by Chemical Formula 2-1 below:

[Chemical Formula 2-1]

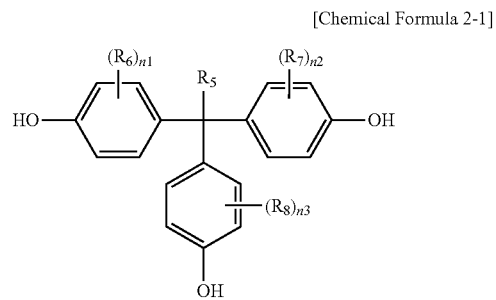

in the Chemical Formula 2-1,
$R_5$ is hydrogen, $C_{1-10}$ alkyl, or

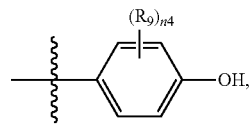

and
$R_6$, $R_7$, $R_8$, $R_9$, n1, n2, n3 and n4 are the same as previously defined.

As used herein, 'derived from aromatic polyol compounds' means that a hydroxy group of the aromatic polyol compound and the carbonate precursor are reacted to form the repeating unit represented by Chemical Formula 2.

For example, when the aromatic polyol compound is THPE (1,1,1-tris (4-hydroxyphenyl)ethane), and is polymerized with triphosgene, which is the carbonate precursor, the repeating unit represented by Chemical Formula 2 is represented by Chemical Formula 2-2 below:

[Chemical Formula 2-2]

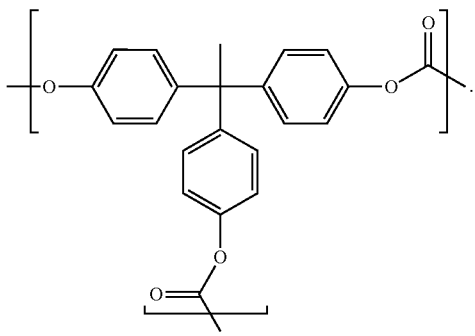

As another example, when the aromatic polyol compound is 4,4',4'',4'''-methanetetrayltetraphenol, and is polymerized with triphosgene, i.e., the carbonate precursor, the repeating unit represented by Chemical Formula 2 is represented by Chemical Formula 2-3 below:

[Chemical Formula 2-3]

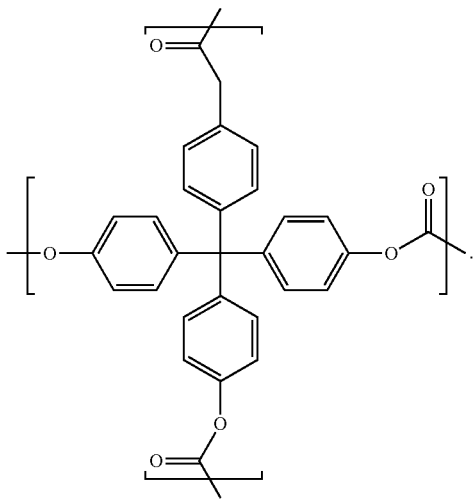

Descriptions of the carbonate precursor that may be used for the formation of the repeating unit represented by Chemical Formula 2 are the same as those described for the carbonate precursor that may be used for the formation of the repeating unit represented by Chemical Formula 1 described above.

Preferably, a weight ratio of the repeating unit represented by Chemical Formula 1 and the repeating unit represented by Chemical Formula 2 is 1:0.001 to 1:0.1. The above-described weight ratio corresponds to a weight ratio of the aromatic diol compound and the aromatic polyol compound used in forming the repeating units represented by Chemical Formulas 1 and 2.

The branched polycarbonate (a) may be prepared by polymerizing the above-described aromatic diol compound, the above-described aromatic polyol compound, and the carbonate precursor.

In addition, as the polymerization method, an interfacial polymerization method may be used as one example. In this case, the polymerization reaction may be carried out at low temperature and atmospheric pressure, and may easily control a molecular weight. The interfacial polymerization may be preferably conducted in the presence of an acid binder and an organic solvent. Furthermore, the interfacial polymerization may comprise, for example, steps of conducting pre-polymerization, then adding a coupling agent and conducting polymerization again. In this case, a copolycarbonate having a high molecular weight may be obtained.

The materials used in the interfacial polymerization are not particularly limited as long as they may be used in polymerization of polycarbonates. The used amount thereof may be adjusted as required.

The acid binder may include, for example, alkali metal hydroxides such as sodium hydroxide, potassium hydroxide, etc., or amine compounds such as pyridine, etc.

The organic solvent is not particularly limited as long as it is a solvent that is usually used in the polymerization of polycarbonates. As one example, halogenated hydrocarbons such as methylene chloride, chlorobenzene, etc., may be used.

Further, during the interfacial polymerization, a reaction accelerator, for example, a tertiary amine compound such as triethylamine, tetra-n-butylammonium bromide, tetra-n-butylphosphonium bromide, or the like, a quaternary ammonium compound, a quaternary phosphonium compound, or the like, may be further used for accelerating the reaction.

In the interfacial polymerization, the reaction temperature may be preferably 0 to 40° C., and the reaction time may be preferably 10 minutes to 5 hours. Further, during the interfacial polymerization reaction, pH may be preferably maintained at 9 or more, or 11 or more.

In addition, the interfacial polymerization reaction may be carried out by further comprising a molecular weight modifier. The molecular weight modifier may be added before the initiation of polymerization, during the initiation of polymerization, or after the initiation of polymerization.

As the molecular weight modifier, mono-alkyl phenol may be used. As one example, the mono-alkyl phenol is at least one selected from the group consisting of p-tert-butyl phenol, p-cumyl phenol, decyl phenol, dodecyl phenol, tetradecyl phenol, hexadecyl phenol, octadecyl phenol, eicosyl phenol, docosyl phenol and triacontyl phenol. Preferably, the mono-alkyl phenol may be p-tert-butylphenol, and in this case, the effect of adjusting the molecular weight is great.

The above molecular weight modifier is contained, for example, in an amount of not less than 0.01 parts by weight, not less than 0.1 parts by weight, or not less than 1 part by weight; and not more than 10 parts by weight, not more than 6 parts by weight, or not more than 5 parts by weight, based on 100 parts by weight of the aromatic diol compound. Within this range, the required molecular weight may be obtained.

In addition, the branched polycarbonate (a) preferably has a weight average molecular weight of 1,000 to 100,000 g/mol, and more preferably, 15,000 to 35,000 g/mol. More preferably, the weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the weight average molecular weight is not more than 34,000, not more than 33,000, or not more than 32,000.

Copolycarbonate (b)

The copolycarbonate (b) according to the present invention is distinguished from the above-described branched polycarbonate (a) in that a polysiloxane structure is introduced in a main chain of the polycarbonate.

A molar ratio of the aromatic polycarbonate-based first repeating unit and the one or more aromatic polycarbonate-based second repeating units having siloxane bonds is preferably 1:0.004 to 0.006, and a weight ratio thereof is preferably 1:0.04 to 0.07.

In addition, preferably, the copolycarbonate may comprise two kinds of aromatic polycarbonate-based second repeating units having siloxane bonds.

Specifically, the aromatic polycarbonate-based first repeating unit is formed by reacting the aromatic diol compound and the carbonate precursor, and preferably, is represented by Chemical Formula 3 below:

[Chemical Formula 3]

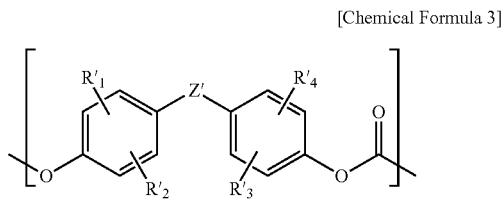

in the Chemical Formula 3,

R'$_1$, R'$_2$, R'$_3$ and R'$_4$ are each independently hydrogen, C$_{1-10}$ alkyl, C$_{1-10}$ alkoxy, or halogen, and Z' is C$_{1-10}$ alkylene unsubstituted or substituted with phenyl, C$_{3-15}$ cycloalkylene unsubstituted or substituted with C$_{1-10}$ alkyl, O, S, SO, SO$_2$, or CO.

Preferably, R'$_1$, R'$_2$, R'$_3$ and R'$_4$ are each independently hydrogen, methyl, chloro, or bromo.

In addition, preferably, Z' is a linear or branched C$_{1-10}$ alkylene unsubstituted or substituted with phenyl, and more preferably, methylene, ethane-1,1-diyl, propane-2,2-diyl, butane-2,2-diyl, 1-phenylethane-1,1-diyl, or diphenylmethylene. In addition, preferably, Z' is cyclohexane-1,1-diyl, O, S, SO, SO$_2$, or CO.

Further, preferably, R'$_1$, R'$_2$, R'$_3$, R'$_4$ and Z' are the same as previously described for R$_1$, R$_2$, R$_3$, R$_4$ and Z in Chemical Formula 1, respectively.

Preferably, the repeating unit represented by Chemical Formula 3 may be derived from any one or more aromatic diol compounds selected from the group consisting of bis (4-hydroxyphenyl)methane, bis(4-hydroxyphenyl)ether, bis (4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl) propyl]polydimethylsiloxane.

As used herein, 'derived from aromatic diol compounds' means that a hydroxy group of the aromatic diol compound and the carbonate precursor are reacted to form the repeating unit represented by Chemical Formula 3.

For example, when bisphenol A, which is the aromatic diol compound, and triphosgene, which the carbonate precursor, are polymerized, the repeating unit represented by Chemical Formula 3 is represented by Chemical Formula 3-1 below:

[Chemical Formula 3-1]

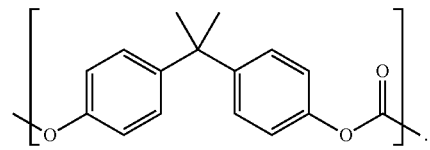

The carbonate precursor is the same as previously described in the carbonate precursor that is capable of being used for forming the above-described repeating unit represented by Chemical Formula 1.

The one or more aromatic polycarbonate-based second repeating units having siloxane bonds is formed by reacting one or more siloxane compounds and a carbonate precursor, and it comprises preferably a repeating unit represented by Chemical Formula 4 below and a repeating unit represented by Chemical Formula 5 below:

[Chemical Formula 4]

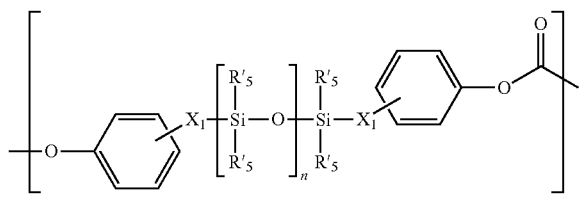

in the Chemical Formula 4,

X$_1$ is each independently C$_{1-10}$ alkylene,

R'$_5$ is each independently hydrogen; C$_{1-15}$ alkyl unsubstituted or substituted with oxiranyl, oxiranyl-substituted C$_{1-10}$ alkoxy, or C$_{6-20}$ aryl; halogen; C$_{1-10}$ alkoxy; allyl; C$_{1-10}$ haloalkyl; or C$_{6-20}$ aryl, and n is an integer of 10 to 200,

[Chemical Formula 5]

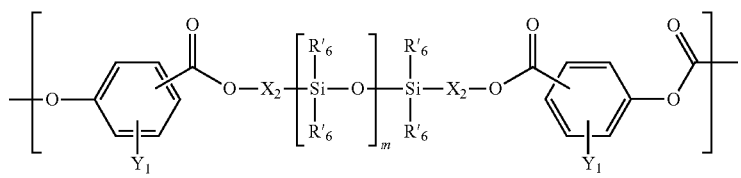

in the Chemical Formula 5, $X_2$ is each independently $C_{1-10}$ alkylene, $Y_1$ is each independently hydrogen, $C_{1-6}$ alkyl, halogen, hydroxy, $C_{1-6}$ alkoxy, or $C_{6-20}$ aryl, $R'_6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 10 to 200.

In Chemical Formula 4, preferably, $X_1$ is each independently $C_{2-10}$ alkylene, and more preferably, $C_{2-4}$ alkylene, and the most preferably, propane-1,3-diyl.

In addition, preferably, $R'_5$ is each independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl or naphthyl. In addition, preferably, $R'_5$ is each independently $C_{1-10}$ alkyl, more preferably, $C_{1-6}$ alkyl, and more preferably, $C_{1-3}$ alkyl, and the most preferably, methyl.

In addition, preferably, n is an integer of not less than 10, not less than 15, not less than 20, not less than 25, not less than 26, not less than 27, or not less than 28; and not more than 50, not more than 45, not more than 40, not more than 35, not more than 34, or not more than 33.

In Chemical Formula 3, preferably, $X_2$ is each independently $C_{2-10}$ alkylene, and more preferably, $C_{2-6}$ alkylene, and the most preferably, isobutylene.

In addition, preferably, $Y_1$ is hydrogen.

In addition, preferably, $R'_6$ is each independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl or naphthyl. In addition, preferably, $R'_6$ is each independently $C_{1-10}$ alkyl, more preferably, $C_{1-6}$ alkyl, and more preferably, $C_{1-3}$ alkyl, and the most preferably, methyl.

Preferably, m is an integer of not less than 40, not less than 45, not less than 50, not less than 55, not less than 56, not less than 57, or not less than 58; and not more than 80, not more than 75, not more than 70, not more than 65, not more than 64, not more than 63, or not more than 62.

The repeating unit represented by Chemical Formula 4 and the repeating unit represented by Chemical Formula 5 are derived from a siloxane compound represented by Chemical Formula 4-1 below and a siloxane compound represented by Chemical Formula 5-1 below, respectively:

[Chemical Formula 4-1]

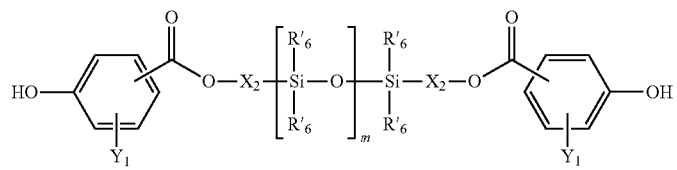

in the Chemical Formula 4-1, $X_1$, $R'_5$ and n are the same as previously described, in the Chemical Formula 5-1, $X_2$, $Y_1$, $R'_6$ and m are the same as previously described.

As used herein, 'derived from a siloxane compound' means that a hydroxy group of each of the siloxane compounds and a carbonate precursor are reacted to form the repeating unit represented by Chemical Formula 4 and the repeating unit represented by the Chemical Formula 5, respectively.

Further, descriptions of the carbonate precursors that may be used for the formation of the repeating units represented by Chemical Formulas 4 and 5 are the same as those described for the carbonate precursor that may be used for the formation of the repeating unit represented by Chemical Formula 1 described above.

Methods for preparing the siloxane compound represented by Chemical Formula 4-1 and the siloxane compound represented by Chemical Formula 5-1 are represented by Reaction Schemes 1 and 2 below, respectively:

[Reaction Scheme 1]

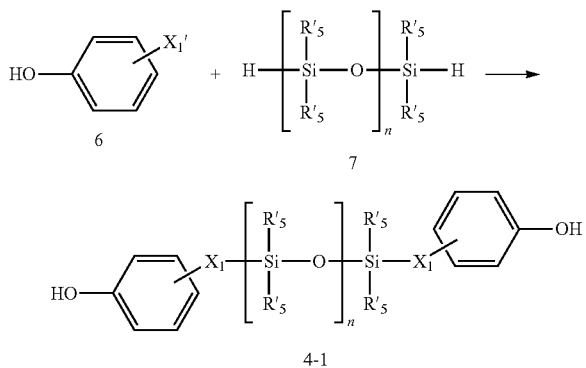

4-1 in the Reaction Scheme 1, $X_1'$ is $C_{2-10}$ alkenyl, and $X_1$, $R'_5$ and n are the same as previously defined,

[Reaction Scheme 2]

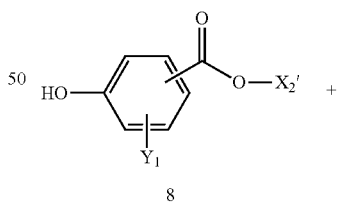

8

[Chemical Formula 5-1]

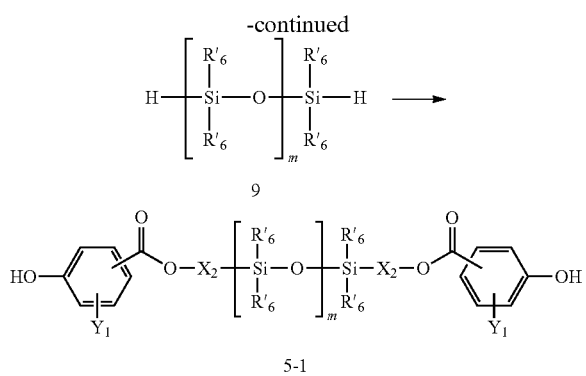

in the Reaction Scheme 2,
$X_2'$ is $C_{2-10}$ alkenyl, and
$X_2$, $Y_1$, $R'_6$ and m are the same as previously defined.

In Reaction Scheme 1 and Reaction Scheme 2, the reaction may be preferably conducted in the presence of a metal catalyst. As the metal catalyst, a platinum (Pt) catalyst may be preferably used. The Pt catalyst may include at least one selected from the group consisting of Ashby catalyst, Karstedt catalyst, Lamoreaux catalyst, Speier catalyst, $PtCl_2$ (COD), $PtCl_2$(benzonitrile)$_2$, and $H_2PtBr_6$. The metal catalyst may be used in an amount of not less than 0.001 parts by weight, not less than 0.005 parts by weight, or not less than 0.01 parts by weight; and not more than 1 part by weight, not more than 0.1 parts by weight, or not more than 0.05 parts by weight, based on 100 parts by weight of the compound represented by Chemical Formula 7 or 9.

Further, the above reaction temperature is preferably 80 to 100° C. In addition, the above reaction time is preferably 1 to 5 hours.

In addition, the compound represented by Chemical Formula 7 or 9 may be prepared by reacting an organodisiloxane and an organocyclosiloxane in the presence of an acid catalyst, and n and m may be adjusted by adjusting amounts of the reaction materials. The above reaction temperature is preferably 50 to 70° C. In addition, the above reaction time is preferably 1 to 6 hours.

As the organodisiloxane, at least one selected from the group consisting of tetramethyldisiloxane, tetraphenyldisiloxane, hexamethyldisiloxane, and hexaphenyldisiloxane may be used. In addition, as the organocyclosiloxane, for example, organocyclotetrasiloxane may be used. Examples of the organocyclotetrasiloxane may include octamethylcyclotetrasiloxane, octaphenylcyclotetrasiloxane, etc.

The organodisiloxane may be used in an amount of not less than 0.1 parts by weight, or not less than 2 parts by weight; and not more than 10 parts by weight, or not more than 8 parts by weight, based on 100 parts by weight of the organocyclosiloxane.

As the acid catalyst, at least one selected from the group consisting of $H_2SO_4$, $HClO_4$, $AlCl_3$, $SbCl_5$, $SnCl_4$ and acid clay may be used. Further, the acid catalyst may be used in an amount of not less than 0.1 parts by weight, not less than 0.5 parts by weight, or not less than 1 part by weight; and not more than 10 parts by weight, not more than 5 parts by weight, not more than 3 parts by weight, based on 100 parts by weight of the organocyclosiloxane.

Particularly, the amount of the repeating unit represented by Chemical Formula 4 and the amount of the repeating unit represented by Chemical Formula 5 may be adjusted. A weight ratio between the repeating units may be 1:99 to 99:1. Preferably, the weight ratio is 3:97 to 97:3, 5.95 to 95:5, 10:90 to 90:10, or 15:85 to 85:15, and more preferably, 20:80 to 80:20. The weight ratio of the repeating units corresponds to a weight ratio of siloxane compounds, for example, the siloxane compound represented by Chemical Formula 4-1 and the siloxane compound represented by Chemical Formula 5-1.

Preferably, the repeating unit represented by Chemical Formula 4 is represented by Chemical Formula 4-2 below:

[Chemical Formula 4-2]

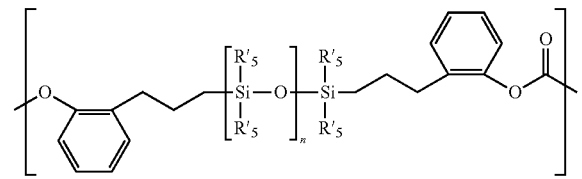

in the Chemical Formula 4-2, $R'_5$ and n are the same as previously defined. Preferably, $R'_5$ is methyl.

In addition, preferably, the repeating unit represented by Chemical Formula 5 is represented by Chemical Formula 5-2 below:

[Chemical Formula 5-2]

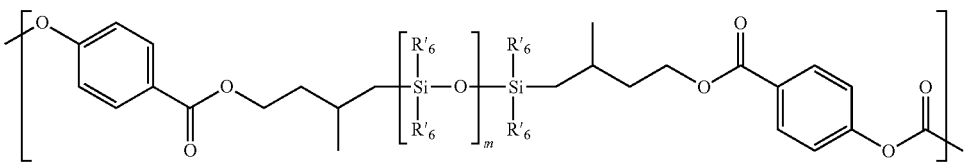

in the Chemical Formula 5-2, $R'_6$ and m are the same as previously defined. Preferably, $R'_6$ is methyl.

In addition, preferably, the copolycarbonate according to the present invention comprises all of the repeating unit represented by Chemical Formula 3-1, the repeating unit represented by Chemical Formula 4-2, and the repeating unit represented by Chemical Formula 5-2.

In addition, the present invention provides a method for preparing the copolycarbonate comprising a step of polymerizing an aromatic diol compound, a carbonate precursor, and one or more siloxane compounds, as a method for preparing the above-described copolycarbonate.

The aromatic diol compound, the carbonate precursor, and one or more siloxane compounds are the same as previously described.

During the polymerization, the one or more siloxane compounds may be used in an amount of not less than 0.1 wt %, not less than 0.5 wt %, not less than 1 wt %, not less than 1.5 wt %, not less than 2.0 wt %, not less than 2.5 wt %, or not less than 3.0 wt %; and not more than 20 wt %, not more than 10 wt %, not more than 7 wt %, not more than 5 wt %, or not more than 4 wt %, based on 100 wt % in total of the aromatic diol compound, the carbonate precursor, and the one or more siloxane compounds. In addition, the aromatic diol compound may be used in an amount of not less than 40 wt %, not less than 50 wt %, or not less than 55 wt %; and not more than 80 wt %, not more than 70 wt %, or not more than 65 wt %, based on 100 wt % in total of the aromatic diol compound, the carbonate precursor, and the one or more siloxane compounds. In addition, the carbonate precursor may be used in an amount of not less than 10 wt %, not less than 20 wt %, or not less than 30 wt %; and not more than 60 wt %, not more than 50 wt %, or not more than 40 wt %, based on 100 wt % in total of the aromatic diol compound, the carbonate precursor, and the one or more siloxane compounds.

In addition, as the polymerization method, an interfacial polymerization method may be used as one example. In this case, the polymerization reaction may be carried out at low temperature and atmospheric pressure, and may easily control a molecular weight. The interfacial polymerization may be preferably conducted in the presence of an acid binder and an organic solvent. Furthermore, the interfacial polymerization may comprise, for example, steps of conducting pre-polymerization, then adding a coupling agent and conducting polymerization again. In this case, a copolycarbonate having a high molecular weight may be obtained.

The materials used in the interfacial polymerization are not particularly limited as long as they may be used in polymerization of polycarbonates. The used amount thereof may be adjusted as required.

The acid binder may include, for example, alkali metal hydroxides such as sodium hydroxide, potassium hydroxide, etc., or amine compounds such as pyridine, etc.

The organic solvent is not particularly limited as long as it is a solvent that is usually used in the polymerization of polycarbonates. As one example, halogenated hydrocarbons such as methylene chloride, chlorobenzene, etc., may be used.

Further, during the interfacial polymerization, a reaction accelerator, for example, a tertiary amine compound such as triethylamine, tetra-n-butylammonium bromide, tetra-n-butylphosphonium bromide, or the like, a quaternary ammonium compound, a quaternary phosphonium compound, or the like, may be further used for accelerating the reaction.

In the interfacial polymerization, the reaction temperature may be preferably 0 to 40° C., and the reaction time may be preferably 10 minutes to 5 hours. Further, during the interfacial polymerization reaction, pH may be preferably maintained at 9 or more, or 11 or more.

In addition, the interfacial polymerization reaction may be carried out by further comprising a molecular weight modifier.

The molecular weight modifier may be added before the initiation of polymerization, during the initiation of polymerization, or after the initiation of polymerization.

As the molecular weight modifier, mono-alkyl phenol may be used. As one example, the mono-alkyl phenol is at least one selected from the group consisting of p-tert-butyl phenol, p-cumyl phenol, decyl phenol, dodecyl phenol, tetradecyl phenol, hexadecyl phenol, octadecyl phenol, eicosyl phenol, docosyl phenol and triacontyl phenol. Preferably, the mono-alkyl phenol may be p-tert-butylphenol, and in this case, the effect of adjusting the molecular weight is great.

The molecular weight modifier may be used in an amount of not less than 0.01 parts by weight, not less than 0.1 parts by weight, or not less than 1 part by weight; and not more than 10 parts by weight, not more than 6 parts by weight, or not more than 5 parts by weight, based on 100 parts by weight of the aromatic diol compound. Within the range as described above, a desired molecular weight may be obtained.

In addition, the copolycarbonate (b) preferably has a weight average molecular weight of 1,000 to 100,000 g/mol, and more preferably, 15,000 to 35,000 g/mol. More preferably, the weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the weight average molecular weight is not more than 34,000, not more than 33,000, or not more than 32,000.

Polycarbonate Composition

The polycarbonate composition according to the present invention comprises the above-described branched polycarbonate (a) and the copolycarbonate (b).

In the polycarbonate composition, a weight ratio of the branched polycarbonate and the copolycarbonate is 1.99 to 99:1. More preferably, the weight ratio is 3:97 to 97:3, 5.95 to 95:5, 10:90 to 90:10, 15:85 to 85:15, or 20:80 to 80:20.

In addition, the polycarbonate composition according to the present invention may be used together with an unbranched polycarbonate as needed. The unbranched polycarbonate is distinguished from the branched polycarbonate (a) and the copolycarbonate (b) in that a polysiloxane structure is not introduced in the main chain of the polycarbonate and a branched repeating unit is not included.

Preferably, the unbranched polycarbonate comprises a repeating unit represented by Chemical Formula 6 below:

[Chemical Formula 6]

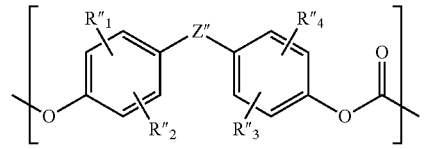

in the Chemical Formula 6, $R''_1$, $R''_2$, $R''_3$ and $R''_4$ are each independently hydrogen, $C_{1-10}$ alkyl, $C_{1-10}$ alkoxy, or halogen, and $Z''$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

In addition, preferably, the unbranched polycarbonate has a weight average molecular weight of 15,000 to 35,000 g/mol. More preferably, the weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the weight average molecular weight is not more than 34,000, not more than 33,000, or not more than 32,000.

The repeating unit represented by Chemical Formula 6 is formed by reacting an aromatic diol compound and the carbonate precursor. Further, descriptions of the aromatic diol compound and the carbonate precursor that may be used above are the same as those described in the repeating unit represented by Chemical Formula 1 described above.

Preferably, $R''_1$, $R''_2$, $R''_3$, $R''_4$ and $Z''$ in Chemical Formula 4 are the same as previously described for $R_1$, $R_2$, $R_3$, $R_4$ and $Z$ in Chemical Formula 1, respectively.

In addition, preferably, the repeating unit represented by Chemical Formula 6 is represented by Chemical Formula 6-1 below:

[Chemical Formula 6-1]

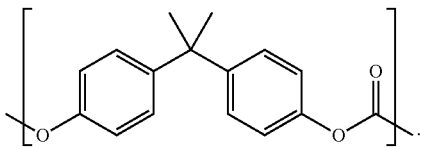

In addition, the present invention provides an article comprising the polycarbonate composition.

Preferably, the article is an injection-molded article. In addition, the article may further comprises one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments, and dyes.

A method for manufacturing the article may comprise steps of mixing the polycarbonate composition according to the present invention and the additives such as the antioxidant, etc., using a mixer, extrusion-molding the mixture with an extruder to produce a pellet, drying the pellet and then injecting the dried pellet with an injection molding machine.

Advantageous Effects

As set forth above, the polycarbonate composition according to the present invention comprises the copolycarbonate comprising the specific siloxane structure and the branched polycarbonate comprising the branched repeating unit to improve flame retardancy and chemical resistance while maintaining high impact strength and melt index.

DETAILED DESCRIPTION OF THE EMBODIMENTS

Hereinafter, preferable examples of the present invention will be provided for better understanding of the present invention. However, the following examples are provided only for illustration of the present invention, and should not be construed as limiting the present invention by the examples.

Preparation Example 1: Preparation of Polyorganosliloxane (AP-30)

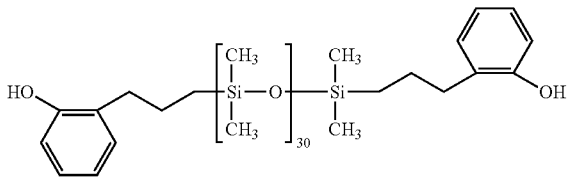

After 42.5 g (142.8 mmol) of octamethylcyclotetrasiloxane and 2.26 g (16.8 mmol) of tetramethyldisiloxane were mixed, the mixture was placed in a 3 L flask with 1 part by weight of acid clay (DC-A3) based on 100 parts by weight of octamethylcyclotetrasiloxane, and reacted at 60° C. for 4 hours. After the reaction was terminated, the reaction product was diluted with ethylacetate and quickly filtered using a celite. The repeating unit (n) of the unmodified polyorganosiloxane obtained as described above was 30 when confirmed through $^1$H NMR.

9.57 g (71.3 mmol) of 2-allylphenol and 0.01 g (50 ppm) of Karstedt's platinum catalyst were added to the obtained terminal-unmodified polyorganosiloxane and reacted at 90° C. for 3 hours. After the reaction was terminated, the unreacted polyorganosiloxane was removed by evaporation under condition of 120° C. and 1 torr. The terminal-modified polyorganosiloxane obtained as described above was designated as 'AP-30'. AP-30 was pale yellow oil, the repeating unit (n) was 30 when confirmed through $^1$H NMR using Varian 500 MHz, and further purification was not required.

Preparation Example 2: Preparation of Polyorganosiloxane (MB-60)

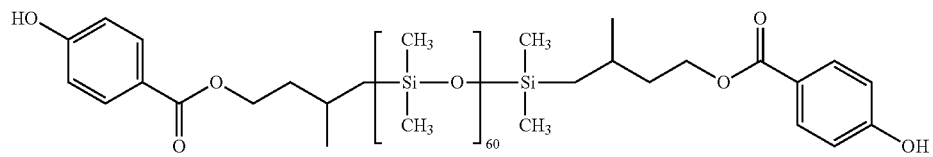

After 47.60 g (160 mmol) of octamethylcyclotetrasiloxane and 1.5 g (11 mmol) of tetramethyldisiloxane were mixed, the mixture was placed in a 3 L flask with 1 part by weight of acid clay (DC-A3) based on 100 parts by weight of octamethylcyclotetrasiloxane, and reacted at 60° C. for 4 hours. After the reaction was terminated, the reaction product was diluted with ethylacetate and quickly filtered using a celite. The repeating unit (m) of the terminal-unmodified polyorganosiloxane obtained as described above was 60 when confirmed through $^1$H NMR.

6.13 g (29.7 mmol) of 3-methylbut-3-enyl 4-hydroxybenzoate and 0.01 g (50 ppm) of Karstedt's platinum catalyst were added to the obtained terminal-unmodified polyorganosiloxane and reacted at 90° C. for 3 hours. After the reaction was terminated, the unreacted polyorganosiloxane was removed by evaporation under condition of 120° C. and 1 torr. The terminal-modified polyorganosiloxane obtained as described above was designated as 'MB-60'. MB-60 was pale yellow oil, the repeating unit (m) was 60 when confirmed through $^1$H NMR using Varian 500 MHz, and further purification was not required.

Preparation Example 3: Preparation of Copolycarbonate (PPC)

978.4 g of bisphenol A (BPA), 1,620 g of 32% NaOH aqueous solution, and 7,500 g of distilled water were placed in a 20 L glass reactor, and it was confirmed that the BPA was completely dissolved in a nitrogen atmosphere. Then, 3,670 g of methylene chloride, 18.3 g of p-tert-butylphenol (PTBP), 49.68 g of the previously prepared polyorganosiloxane (AP-30), and 5.52 g of the polyorganosiloxane (MB-60) of Preparation Example 2 were added thereto and mixed. To the mixture, 3,850 g of methylene chloride in which 542.5 g of triphosgene was dissolved, was added dropwise for one hour. Here, pH of the NaOH aqueous solution was maintained at pH 12. After the addition was terminated, the mixture was aged for 15 minutes, and 195.7 g of triethylamine was dissolved in methylene chloride (MC) and then added to the mixture. After 10 minutes, pH of the mixture was adjusted to pH 3 with 1N hydrochloric acid aqueous solution. The obtained product was washed three times with distilled water to separate the methylenechloride phase, and precipitated in methanol to obtain a copolycarbonate resin in a powder form. The obtained resin was designated as 'PPC'.

Preparation Example 4: Preparation of Branched Polycarbonate (B-PC)

978.4 g of bisphenol A (BPA), 3.2 g of THPE (1,1,1-tris(4-hydroxyphenyl)ethane), 1,620 g of 32% NaOH aqueous solution, and 7,500 g of distilled water were placed in a 20 L glass reactor, and it was confirmed that the BPA was completely dissolved in a nitrogen atmosphere. Then, 3,670 g of methylene chloride, and 21.0 g of p-tert-butylphenol (PTBP) were added thereto and mixed. To the mixture, 3,850 g of methylene chloride in which 542.5 g of triphosgene was dissolved, was added dropwise for one hour. Here, pH of the NaOH aqueous solution was maintained at pH 12. After the addition was terminated, the mixture was aged for 15 minutes, and 195.7 g of triethylamine was dissolved in methylene chloride and then added to the mixture. After 10 minutes, pH of the mixture was adjusted to pH 3 with 1N hydrochloric acid aqueous solution. The obtained product was washed three times with distilled water to separate the methylenechloride phase, and precipitated in methanol to obtain a polycarbonate resin in a powder form. The obtained resin was designated as 'B-PC', and had a weight average molecular weight of 28,100, the weight average molecular weight being measured by GPC with PC Standard using Agilent 1200 series.

Example 1

A polycarbonate composition was prepared by mixing 80 parts by weight of PPC prepared by Preparation Example 3 with 20 parts by weight of B-PC prepared by Preparation Example 4.

Example 2

A polycarbonate composition was prepared by mixing 70 parts by weight of PPC prepared by Preparation Example 3 with 30 parts by weight of B-PC prepared by Preparation Example 4.

Example 3

A polycarbonate composition was prepared by mixing 60 parts by weight of PPC prepared by Preparation Example 3 with 40 parts by weight of B-PC prepared by Preparation Example 4.

Comparative Example 1

The PPC prepared by Preparation Example 3 was determined as Comparative Example 1.

Comparative Example 2

A polycarbonate resin was obtained by the same method as Preparation Example 3, except that the polyorganosiloxane (AP-30) and the polyorganosiloxane (MB-60) were not used. The obtained polycarbonate resin was determined as Comparative Example 2.

Comparative Example 3

A polycarbonate composition was prepared by mixing 70 parts by weight of PPC prepared by Preparation Example 3 with 30 parts by weight of polycarbonate prepared by Comparative Example 2.

Comparative Example 4

A polycarbonate composition was prepared by mixing 25 parts by weight of B-PC prepared by Preparation Example 4 with 75 parts by weight of polycarbonate prepared by Comparative Example 2.

Experimental Example 0.050 parts by weight of tris(2,4-di-tert-butylphenyl) phosphite, 0.010 parts by weight of octadecyl-3-(3,5-di-tert-butyl-4-hydroxyphenyl)propionate, and 0.030 parts by weight of pentaerythritol tetrastearate were added to 1 part weight of each resin of examples and comparative examples, and then each mixture was pelletized using a ϕ30 mm twin-screw extruder provided with a vent, and injection-molded at a cylinder temperature of 300° C. and a mold temperature of 80° C. using an N-20C injection molding machine of JSW, LTD., to manufacture each specimen.

Characteristics of each specimen were measured as follows:
1) Weight average molecular weight (g/mol): measured by GPC with PC Standard using Agilent 1200 series.
2) Impact strength at room temperature: measured at 23° C. in accordance with ASTM D256 (⅛ inch, Notched Izod).
3) Impact strength at low temperature: measured at −30° C. in accordance with ASTM D256 (⅛ inch, Notched Izod).
4) Melt Index (MI): measured in accordance with ASTM D1238 (under condition of 300° C., 1.2 kg).
5) Flame retardancy: evaluated in accordance with UL 94V. Specifically, five specimens having a thickness of 3.0 mm required for a flame retardancy test were prepared, and evaluated as follows.

First, a flame having a height of 20 mm was applied to each specimen for 10 seconds, and then a combustion time (t1) of the specimen was measured, and a combustion aspect was recorded. Then, after the primary flame-contact, and the combustion was terminated, a flame was in contact with each specimen for another 10 seconds (secondary flame-contact). Next, a combustion time (t2) and a glowing time (t3) of the specimen were measured, and a combustion aspect was recorded. The above-described flame retardancy test was equally applied to five specimens, and the specimens were evaluated as shown in Table 1 below.

TABLE 1

|  | Flame retardancy rating | | |
| --- | --- | --- | --- |
|  | V-0 | V-1 | V-2 |
| Each combustion time (t1 or t2 of each specimen) | Not more than 10 sec | Not more than 30 sec | Not more than 30 sec |
| Total combustion time of five specimens (sum of t1 and t2 of five specimens) | Not more than 50 sec | Not more than 250 sec | Not more than 250 sec |
| Combustion time and glowing time after secondary flame-contact (sum of t2 and t3 of each specimen) | Not more than 30 sec | Not more than 60 sec | Not more than 60 sec |
| Whether particle causing flame is dropped | None | None | Yes |

6) Chemical Resistance: Specimens (thickness: 3.2 mm) were manufactured to measure tensile strength in accordance with ASTM D638, and chemical resistance thereof was measured on the basis of JIG Strain R1.0 in accordance with ASTM D543 (PRACTICE B). Specifically, a cotton cloth (2 cm×2 cm) was placed on the center of each specimen at room temperature (23° C.), and then time required for causing destruction of each specimen from the moment 2 mL of a solvent (Nivea® Aqua Protect Sun Spray—SPF30, Beiersdorf Inc.) was dropped on the cloth, was measured. The measured time was evaluated by the following criteria:
○: 1 hour to 24 hours
X: within 1 minute
The results were shown in Table 2 below.

TABLE 2

|  | Unit | Ex. 1 | Ex. 2 | Ex. 3 | C. EX. 1 | C. EX. 2 | C. EX. 3 | C. EX. 4 |
| --- | --- | --- | --- | --- | --- | --- | --- | --- |
| Mw | g/mol | 30,100 | 29,300 | 29,800 | 28,900 | 28,100 | 27,500 | 29,800 |
| Impact strength at room temperature | J/m | 878 | 840 | 811 | 848 | 820 | 815 | 875 |
| Impact strength at low temperature | J/m | 760 | 728 | 699 | 681 | 190 | 350 | 185 |
| Melt index | g/10 min | 10 | 9 | 8 | 10 | 12 | 10 | 11 |
| Flame retardancy | — | V-1 | V-1 | V-0 | V-1 | V-2 | V-1 | V-2 |
| Chemical resistance | — | ○ | ○ | ○ | X | X | X | X |

As shown in Table 2 above, it could be confirmed that examples had an improved chemical resistance while maintaining the impact strength at the same level as compared to comparative examples. Therefore, it could be confirmed that the polycarbonate composition according to the present invention comprises the copolycarbonate comprising the specific siloxane structure and the polycarbonate comprising the branched repeating unit to improve the chemical resistance while maintaining high impact strength.

The invention claimed is:

1. A polycarbonate composition comprising:

(a) a branched polycarbonate comprising a repeating unit represented by Chemical Formula 1 and a trivalent or tetravalent branched repeating unit connecting the plurality of repeating units represented by Chemical Formula 1 to each other; and (b) a copolycarbonate comprising an aromatic polycarbonate-based first repeating unit, and one or more aromatic polycarbonate-based second repeating units having siloxane bonds, wherein the second repeating unit comprises a repeating unit represented by Chemical Formula 4 and a repeating unit represented by Chemical Formula 5:

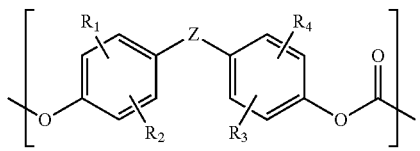

[Chemical Formula 1]

in the Chemical Formula 1, $R_1$, $R_2$, $R_3$ and $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

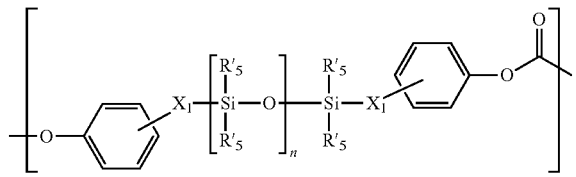

[Chemical Formula 4]

in Chemical Formula 4, $X_1$ is each independently $C_{1-10}$ alkylene, $R'_5$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 10 to 200,

[Chemical Formula 5]

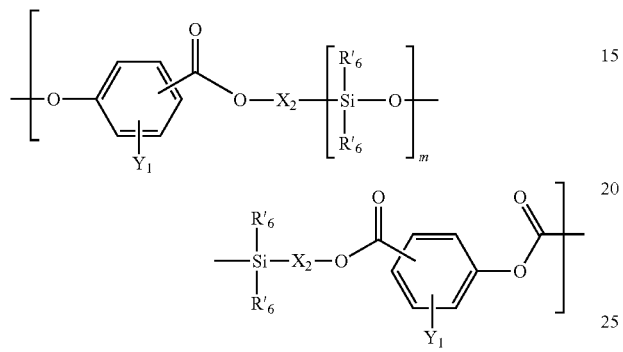

in Chemical Formula 5, $X_2$ is each independently $C_{1-10}$ alkylene, $Y_1$ is each independently hydrogen, $C_{1-6}$ alkyl, halogen, hydroxy, $C_{1-6}$ alkoxy, or $C_{6-20}$ aryl, $R'_6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 10 to 200, and wherein a weight ratio of the branched polycarbonate and the copolycarbonate is 20:80 to 40:60.

2. The polycarbonate composition of claim 1, wherein:
the repeating unit represented by Chemical Formula 1 is derived from any one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane.

3. The polycarbonate composition of claim 1, wherein:
the repeating unit represented by Chemical Formula 1 is represented by Chemical Formula 1-1 below:

[Chemical Formula 1-1]

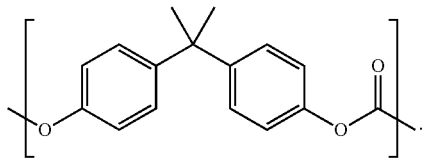

4. The polycarbonate composition of claim 1, wherein:
the trivalent or tetravalent branched repeating unit is a repeating unit represented by Chemical Formula 2 below:

[Chemical Formula 2]

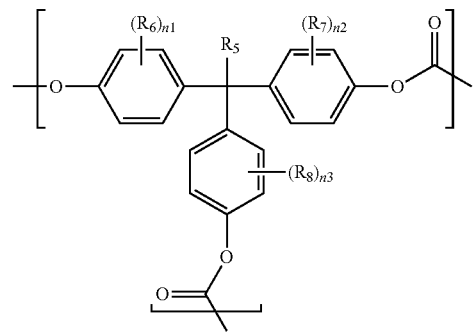

in the Chemical Formula 2, $R_5$ is hydrogen, $C_{1-10}$ alkyl, or

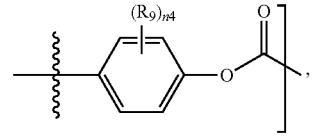

$R_6$, $R_7$, $R_8$ and $R_9$ are each independently hydrogen, $C_{1-10}$ alkyl, halogen, $C_{1-10}$ alkoxy, allyl, $C_{1-10}$ haloalkyl, or $C_{6-20}$ aryl, and n1, n2, n3 and n4 are each independently an integer of 1 to 4.

5. The polycarbonate composition of claim 4, wherein:
the repeating unit represented by Chemical Formula 2 is represented by Chemical Formula 2-2 below or Chemical Formula 2-3 below:

[Chemical Formula 2-2]

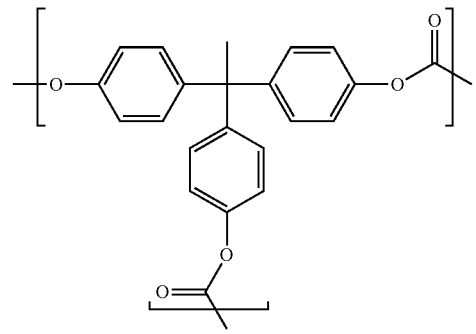

[Chemical Formula 2-3]

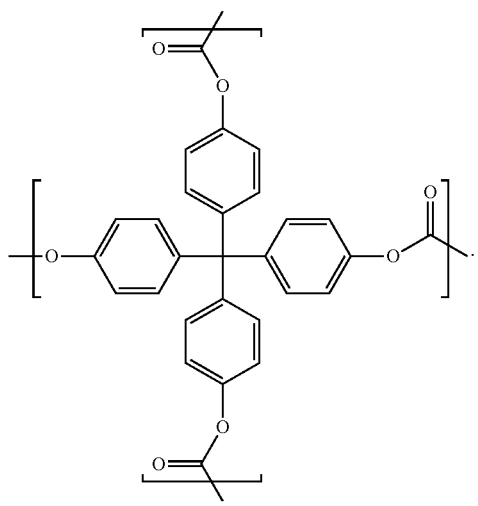

6. The polycarbonate composition of claim 4, wherein:
a weight ratio of the repeating unit represented by Chemical Formula 1 and the repeating unit represented by Chemical Formula 2 is 1:0.001 to 1:0.1.

7. The polycarbonate composition of claim 1, wherein:
a weight average molecular weight of the polycarbonate is 1,000 to 100,000.

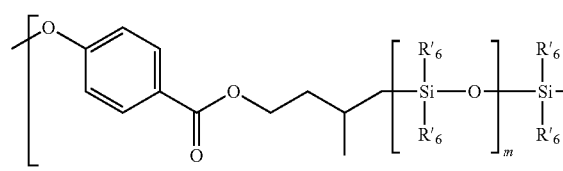

8. The polycarbonate composition of claim 1, wherein:
a polysiloxane structure is not introduced in a main chain of the branched polycarbonate.

9. The polycarbonate composition of claim 1, wherein:
the first repeating unit is represented by Chemical Formula 3 below:

[Chemical Formula 3]

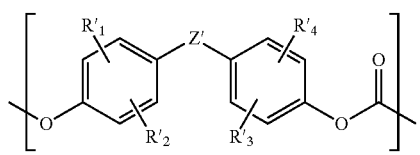

in the Chemical Formula 3,
R'$_1$, R'$_2$, R'$_3$ and R'$_4$ are each independently hydrogen, C$_{1-10}$ alkyl, C$_{1-10}$ alkoxy, or halogen, and
Z' is C$_{1-10}$ alkylene unsubstituted or substituted with phenyl, C$_{3-15}$ cycloalkylene unsubstituted or substituted with C$_{1-10}$ alkyl, O, S, SO, SO$_2$, or CO.

10. The polycarbonate composition of claim 9, wherein:
the Chemical Formula 3 is represented by Chemical Formula 3-1 below:

[Chemical Formula 3-1]

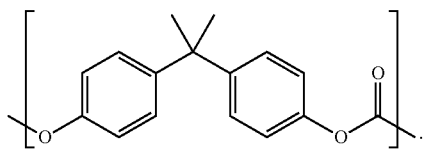

11. The polycarbonate composition of claim 1, wherein:
a weight ratio of the repeating unit represented by Chemical Formula 4 and the repeating unit represented by Chemical Formula 5 is 1:99 to 99:1.

12. The polycarbonate composition of claim 1, wherein:
the repeating unit represented by Chemical Formula 4 is represented by Chemical Formula 4-2 below:

[Chemical Formula 4-2]

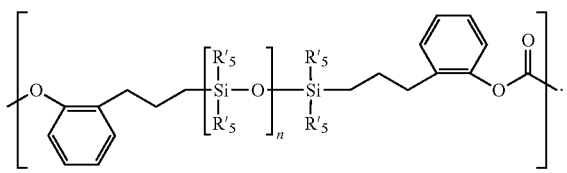

13. The polycarbonate composition of claim 1, wherein:
the repeating unit represented by Chemical Formula 5 is represented by Chemical Formula 5-2 below:

[Chemical Formula 5-2]

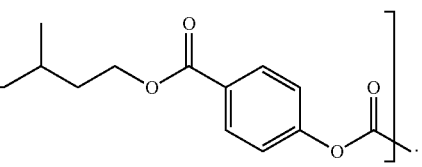

14. The polycarbonate composition of claim 1, wherein:
a weight average molecular weight of the copolycarbonate is 1,000 to 100,000.

15. The polycarbonate composition of claim 1, further comprising:
an unbranched polycarbonate in which a polysiloxane structure is not introduced in a main chain of the polycarbonate, and the branched repeating unit is not included.

16. The polycarbonate composition of claim 15, wherein:
the unbranched polycarbonate comprises a repeating unit represented by Chemical Formula 6 below:

[Chemical Formula 6]

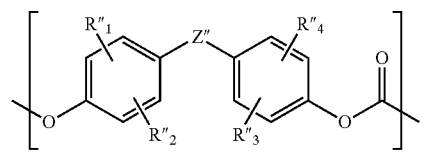

in the Chemical Formula 6,
R"$_1$, R"$_2$, R"$_3$ and R"$_4$ are each independently hydrogen, C$_{1-10}$ alkyl, C$_{1-10}$ alkoxy, or halogen, and Z" is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

* * * * *